United States Patent
Kobayashi et al.

(10) Patent No.: US 6,912,115 B2
(45) Date of Patent: Jun. 28, 2005

(54) MULTILAYER CAPACITOR

(75) Inventors: Ryo Kobayashi, Tokyo (JP); Koki Ito, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/958,288

(22) Filed: Oct. 6, 2004

(65) Prior Publication Data

US 2005/0094350 A1 May 5, 2005

(30) Foreign Application Priority Data

Oct. 30, 2003 (JP) ....................................... 2003-369975

(51) Int. Cl.$^7$ ............................................. H01G 4/228
(52) U.S. Cl. ............................... 361/306.3; 361/306.1; 361/303; 361/311; 361/313; 361/321.2
(58) Field of Search .......................... 361/306.3, 306.1, 361/303, 308.1, 310, 311, 313, 321.1, 321.2, 328, 329

(56) References Cited

U.S. PATENT DOCUMENTS

| | | | | |
|---|---|---|---|---|
| 4,868,711 A | * | 9/1989 | Hirama et al. ............ | 361/321.3 |
| 5,801,111 A | * | 9/1998 | Wada et al. ................. | 501/138 |
| 6,144,547 A | * | 11/2000 | Retseptor ..................... | 361/303 |
| 6,331,930 B1 | * | 12/2001 | Kuroda et al. ............ | 361/306.3 |
| 6,515,842 B1 | * | 2/2003 | Hayworth et al. .......... | 361/303 |

FOREIGN PATENT DOCUMENTS

JP          2000-124064          4/2000

* cited by examiner

Primary Examiner—Dean A. Reichard
Assistant Examiner—Nguyen T. Ha
(74) Attorney, Agent, or Firm—Oblon, Spivak, McClelland, Maier & Neustadt, P.C.

(57) ABSTRACT

A multilayer capacitor includes a multilayer body as a main body of the multilayer capacitor, in which a plurality of internal electrodes and stacked dielectric layers each interposed between the internal electrodes are disposed, being stacked in a stack direction, and dielectrics are disposed on an outer periphery side of the plural internal electrodes, wherein: a pair of upper and lower margin portions in which no internal electrode exists are disposed respectively between end faces positioned in the stack direction of the multilayer body and the internal electrodes that are the closest to the end faces positioned in the stack direction; a pair of right and left margin portions in which no internal electrode exists are disposed respectively between end faces positioned in a direction intersecting the stack direction of the multilayer body and end portions of the internal electrodes; and dimensions of the upper and lower margin portions and dimensions of the right and left margin portions are all 50 $\mu$m to 200 $\mu$m, and a difference between the dimensions of the upper and lower margin portions and the dimensions of the right and left margin portions is within 20% of the dimensions of the upper and lower margin portions. Therefore, a multilayer capacitor is obtained that not only realizes both downsizing and higher capacity but also is excellent in thermal stress resistance even when a large number of layers of internal electrodes are stacked.

18 Claims, 5 Drawing Sheets

MULTILAYER CAPACITOR

BACKGROUND OF THE INVENTION

1. Field of the Invention

The present invention relates to a multilayer capacitor that not only can realize both downsizing and higher capacity, but also is excellent in thermal stress resistance even when a large number of layers of internal electrodes are stacked, and more particularly, to that suitable for use as a multilayer ceramic chip capacitor.

2. Description of the Related Art

A multilayer capacitor such as a multilayer ceramic chip capacitor having a sandwich structure in which dielectric layers made of ceramic and internal electrodes are stacked has been conventionally known. As a device on which such a multilayer capacitor is to be mounted is becoming more downsized and coming to have a higher performance, further downsizing of the multilayer capacitor and further increase in its capacitance are rapidly underway in recent years. In order to realize both downsizing and higher capacity of the multilayer capacitor, it is basically necessary to reduce the thickness per layer of the dielectric layers to make a further multilayered structure.

Meanwhile, margin portions formed only of dielectrics exist on upper, lower, right, and left sides of a portion formed of a stack of dielectric layers and internal electrodes in a multilayer body being a main body of the multilayer capacitor. Conventionally, however, the size of the margin portions has not been specifically stipulated, and the margin portions have dimensions to a degree not causing a lowered yield in a manufacturing process of the multilayer capacitors.

Note that in manufacturing the multilayer capacitor, the right and left margin portions on right and left sides of the internal electrodes have been generally formed to have a relatively wider dimension than the dimension of the upper and lower margin portions on upper and lower sides of the internal electrodes. The upper and lower margin portions and right and left margin portions in which no internal electrode exists tend to be reduced in size in accordance with the recent trend toward thinner and more multilayered dielectric layers accompanying the aforesaid downsizing of the multilayer capacitor and increase in its capacity.

However, heat for soldering or the like is given to the multilayer body when the multilayer capacitor is mounted on a substrate, so that thermal stress occurs in this multilayer body, and with the reduction in size of the margin portions due to the increase in the number of stacked layers, a tendency of a weakened resistance of the multilayer body against this thermal stress has come to be observed.

SUMMARY OF THE INVENTION

In view of the above-described situation, it is an object of the present invention to provide a multilayer capacitor that not only can realize both downsizing and higher capacity, but also is excellent in thermal stress resistance even when a large number of layers of internal electrodes are stacked.

According to one of the modes of the present invention, provided is a multilayer capacitor including a multilayer body as a main body of the multilayer capacitor, in which a plurality of internal electrodes and stacked dielectric layers each interposed between the internal electrodes are disposed, being stacked in a stack direction, and dielectrics are disposed on an outer periphery side of the plural internal electrodes, wherein: a pair of upper and lower margin portions in which no internal electrode exists are disposed respectively between end faces positioned in the stack direction of the multilayer body and the internal electrodes that are the closest to the end faces positioned in the stack direction; a pair of right and left margin portions in which no internal electrode exists are disposed respectively between end faces positioned in a direction intersecting the stack direction of the multilayer body and end portions of the internal electrodes; and dimensions of the upper and lower margin portions and dimensions of the right and left margin portions are all 50 µm to 200 µm, and a difference between the dimensions of the upper and lower margin portions and the dimensions of the right and left margin portions is within 20% of the dimensions of the upper and lower margin portions.

Such a multilayer capacitor has the following operations.

In the multilayer capacitor according to this mode, the multilayer body is formed such that the plural internal electrodes and the stacked dielectric layers each interposed between the internal electrodes are disposed, being stacked in the stack direction, and the dielectrics are disposed on the outer periphery side of the plural internal electrodes, and this multilayer body constitutes-the main body of the multilayer capacitor. Further, the pair of upper and lower margin portions in which no internal electrode exists are disposed respectively between the end faces positioned in the stack direction of the multilayer body and the internal electrodes that are the closest to the end faces positioned in the stack direction. The pair of right and left margin portions in which no internal electrode exists are also disposed respectively between the end faces positioned in the direction intersecting the stack direction of the multilayer body and the end portions of the internal electrodes.

Here, the dimensions of the upper and lower margin portions and the dimensions of the right and left margin portions are all 50 µm to 200 µm, and the difference between the dimensions of the upper and lower margin portions and the dimensions of the right and left margin portions is within 20% of the dimensions of the upper and lower margin portions.

Therefore, in this mode, each of the dimensions of the upper and lower margin portions and right and left margin portions in which no internal electrode exists but only the dielectrics exist is 50 µm or more. This secures the minimum necessary size for these margin portions, so that it is possible to maintain the strength of these margin portions against thermal stress at a predetermined level or more. Further, each of the dimensions of these upper and lower margin portions and right and left margin portions is 200 µm or less. This can prevent the multilayer body from becoming larger than necessary since the maximum size of these margin portions is stipulated.

Another point is that the difference between the dimensions of the upper and lower margin portions and the dimensions of the right and left margin portions is within 20% of the dimensions of the upper and lower margin portions. This limits a ratio of the dimensions of the upper and lower margin portions and the dimensions of the right and left margin portions so that these dimensions become substantially equal to each other, which prevents a great difference in dimension between the upper and lower margin portions and the right and left margin portions. Accordingly, even when heat is given at the time such as the mounting time on a substrate or the like, the upper and left margin portions and the right and left margin portions of the multilayer body can have substantially the same strength against thermal stress, so that the maximum resistant strength against the deformation caused by this thermal stress can be achieved with the minimum volume.

According to this mode, the above-described structure achieves the multilayer capacitor that can realize both downsizing and higher capacity. Moreover, even when a large number of the internal electrodes are stacked, each portion of the multilayer body can have a thermal stress resistant strength that is uniform and equal to or higher than a predetermined level to prevent the occurrence of a crack in the multilayer body. This further makes it possible to obtain a multilayer capacitor having reliability not lowered with time.

According to another mode of the present invention, provided is a multilayer capacitor including a multilayer body as a main body of the multilayer capacitor, in which a plurality of internal electrodes and stacked dielectric layers each interposed between the internal electrodes are disposed, being stacked in a stack direction, and dielectrics are disposed on an outer periphery side of the plural internal electrodes, wherein: a pair of upper and lower margin portions in which no internal electrode exists are disposed respectively between end faces positioned in the stack direction of the multilayer body and the internal electrodes that are the closest to the end faces positioned in the stack direction; a pair of right and left margin portions in which no internal electrode exists are disposed respectively between end faces positioned in a direction intersecting the stack direction of the multilayer body and end portions of the internal electrodes; and dimensions of the upper and lower margin portions and dimensions of the right and left margin portions are all 50 $\mu$m to 200 $\mu$m, a difference between the dimensions of the pair of upper and lower margin portions and a difference between the dimensions of the pair of right and left margin portions are both 20 $\mu$m or less, and a difference between the dimensions of the upper and lower margin portions and the dimensions of the right and left margin portions is within 20% of the dimensions of the upper and lower margin portions.

Such a multilayer capacitor has the following operations.

The multilayer capacitor according to this mode includes the same structure as that of the multilayer capacitor of the above-described mode. In addition, it has the structure such that the difference between the dimensions of the pair of upper and lower margin portions and the difference between the dimensions of the pair of right and left margin portions are both 20 $\mu$m or less.

Therefore, the same operations as those of the above-described mode are achieved. In addition, between the pair of upper and lower margin portions and between the pair of right and left margin portions, the difference in dimension is set to 20 $\mu$m or less respectively. In this way, respective dimension ratios are limited so that the dimensions thereof become substantially equal to each other. This prevents a great difference in the respective dimensions. As a result, the four margin portions in a periphery of the multilayer body can have a substantially uniform strength. Accordingly, the maximum resistant strength against the deformation caused by thermal stress is more surely realized with the minimum volume.

According to still another mode of the present invention, provided is a multilayer capacitor including a multilayer body as a main body of the multilayer capacitor, in which a plurality of internal electrodes and stacked dielectric layers each interposed between the internal electrodes are disposed, being stacked in a stack direction, and dielectrics are disposed on an outer periphery side of the plural internal electrodes, wherein: a pair of upper and lower margin portions in which no internal electrode exists are disposed respectively between end faces positioned in the stack direction of the multilayer body and the internal electrodes that are the closest to the end faces positioned in the stack direction, and a material of dielectric layers forming the pair of upper and lower margin portions is the same as a material of the dielectric layers interposed between the internal electrodes; a pair of right and left margin portions in which no internal electrode exists are disposed respectively between end faces positioned in a direction intersecting the stack direction of the multilayer body and end portions of the internal electrodes; and dimensions of the upper and lower margin portions and dimensions of the right and left margin portions are all 50 $\mu$m to 200 $\mu$m, and a difference between the dimensions of the upper and lower margin portions and the dimensions of the right and left margin portions is within 20% of the dimensions of the upper and lower margin portions.

Such a multilayer capacitor has the following operations.

The multilayer capacitor according to this mode includes the same structure as that of the multilayer capacitor of the above-described mode. In addition, it has the structure such that the material of the dielectric layers forming the upper and lower margin portions is the same as the material of the dielectric layers interposed between the internal electrodes.

Therefore, the operation that the upper and lower margin portions and the right and left margin portions can have a substantially uniform strength is achieved similarly to the above-described mode, and in addition, the strength of the material itself against thermal stress is also made uniform since the same material is used for these portions. Therefore, the maximum resistant strength against thermal stress can be more surely obtained with the minimum volume.

As a modification example of the multilayer capacitor according to each of the above-described modes of the present invention, such a structure, is conceivable that: the internal electrodes are constituted of a plurality of first internal electrodes led out to one end side of the multilayer body and a plurality of second internal electrodes led out to the other end side of the multilayer body, and the first internal electrodes and the second internal electrodes are stacked, being alternately arranged; and a first terminal electrode is disposed on a side face on the one end side of the multilayer body so as to be connected to the plural first internal electrodes, and a second terminal electrode is disposed on a side face on the other end side of the multilayer body so as to be -connected to the plural second internal electrodes.

In short, according to this modification example, the same operations as those of each of the above-described modes are achieved. In addition, the first terminal electrode is disposed on the side face on one end side of the multilayer body so as to be connected to the plural first internal electrodes, and the second terminal electrode is disposed on the side face on the other end side of the multilayer body so as to be connected to the plural second internal electrodes, so that the internal electrodes are connected to an external circuit board via these terminal electrodes.

This structure surely ensures capacitance by the dielectric layers interposed between the first internal electrodes and the second internal electrodes.

DETAILED DESCRIPTION OF THE PREFERRED EMBODIMENT

Hereinafter, an embodiment of the multilayer capacitor according to the present invention will be described based on the drawings.

As shown in FIG. 1 to FIG. 5, a multilayer capacitor 10 being a multilayer ceramic chip capacitor according to an embodiment of the present invention has as a main body thereof a dielectric element 12 being a multilayer body in a rectangular parallelepiped shape obtained by sintering a stack of a plurality of ceramic green sheets which are dielectric sheets.

Figure 1:
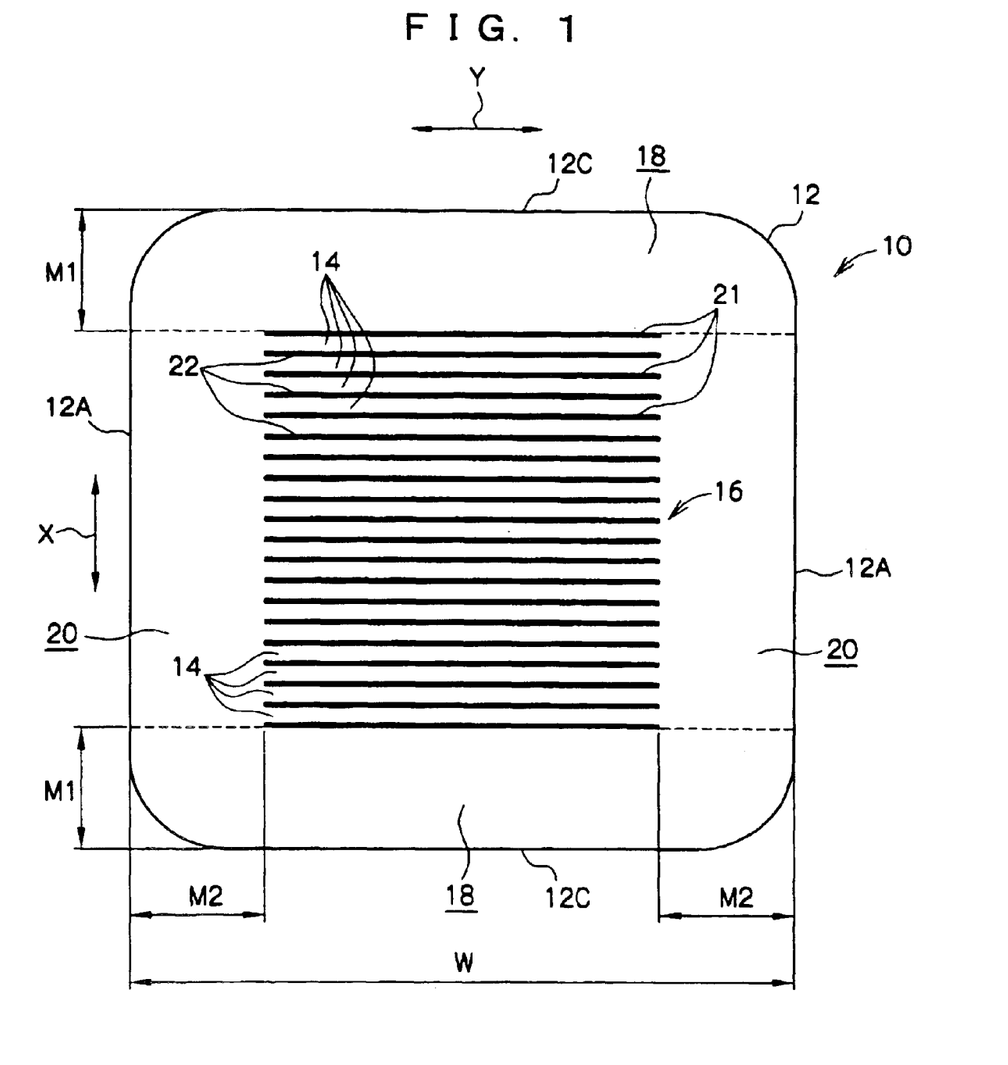
FIG. 1 is a cross-sectional view showing a multilayer capacitor according to an embodiment of the present invention and is a view corresponding to a cross section taken along the 1—1 line shown by the arrows in FIG. 3.
Figure 2:
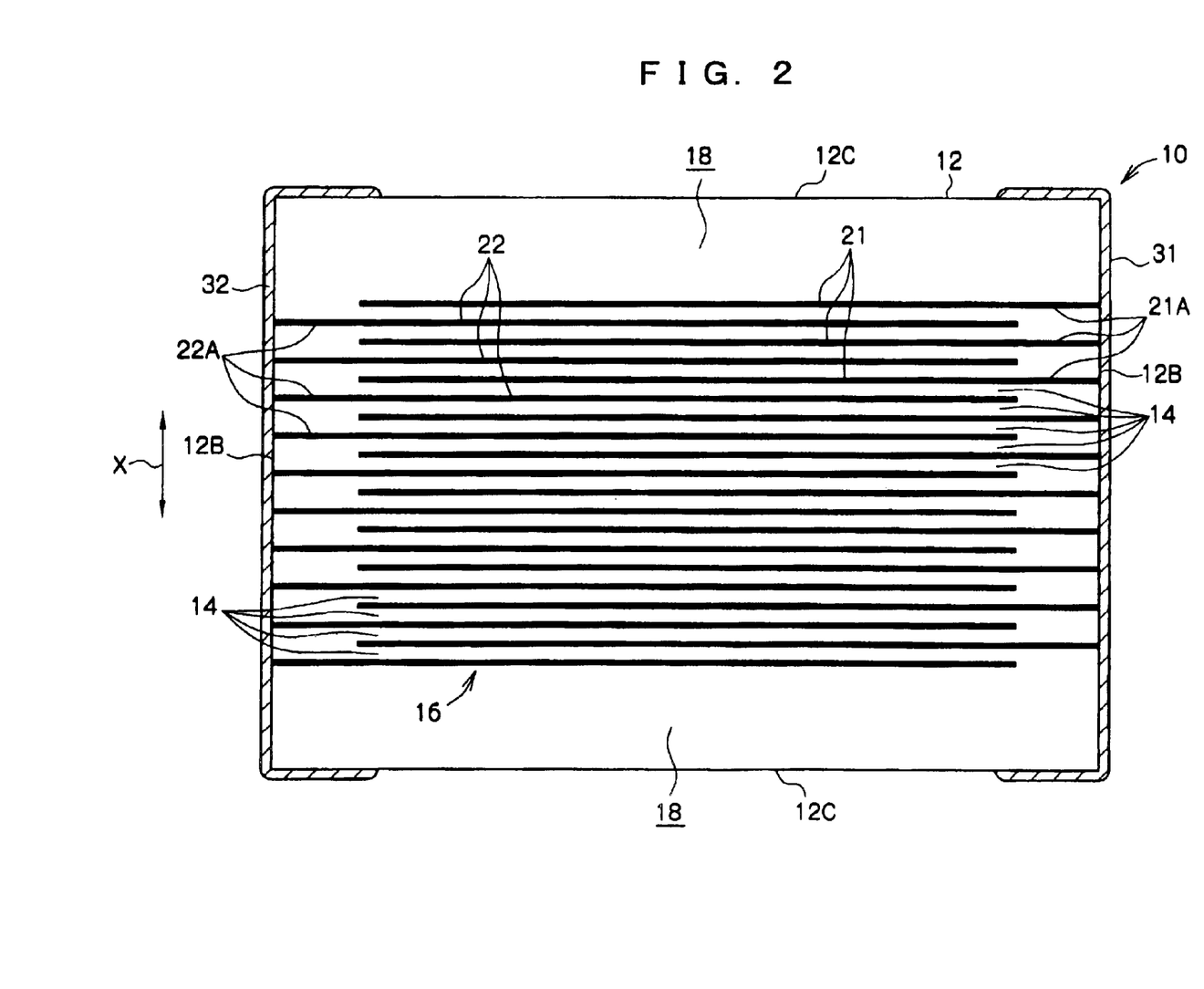
FIG. 2 is a cross-sectional view showing the multilayer capacitor according to the embodiment of the present invention and is a view corresponding to a cross section taken along the 2—2 line shown by the arrows in FIG. 3.
Figure 5:
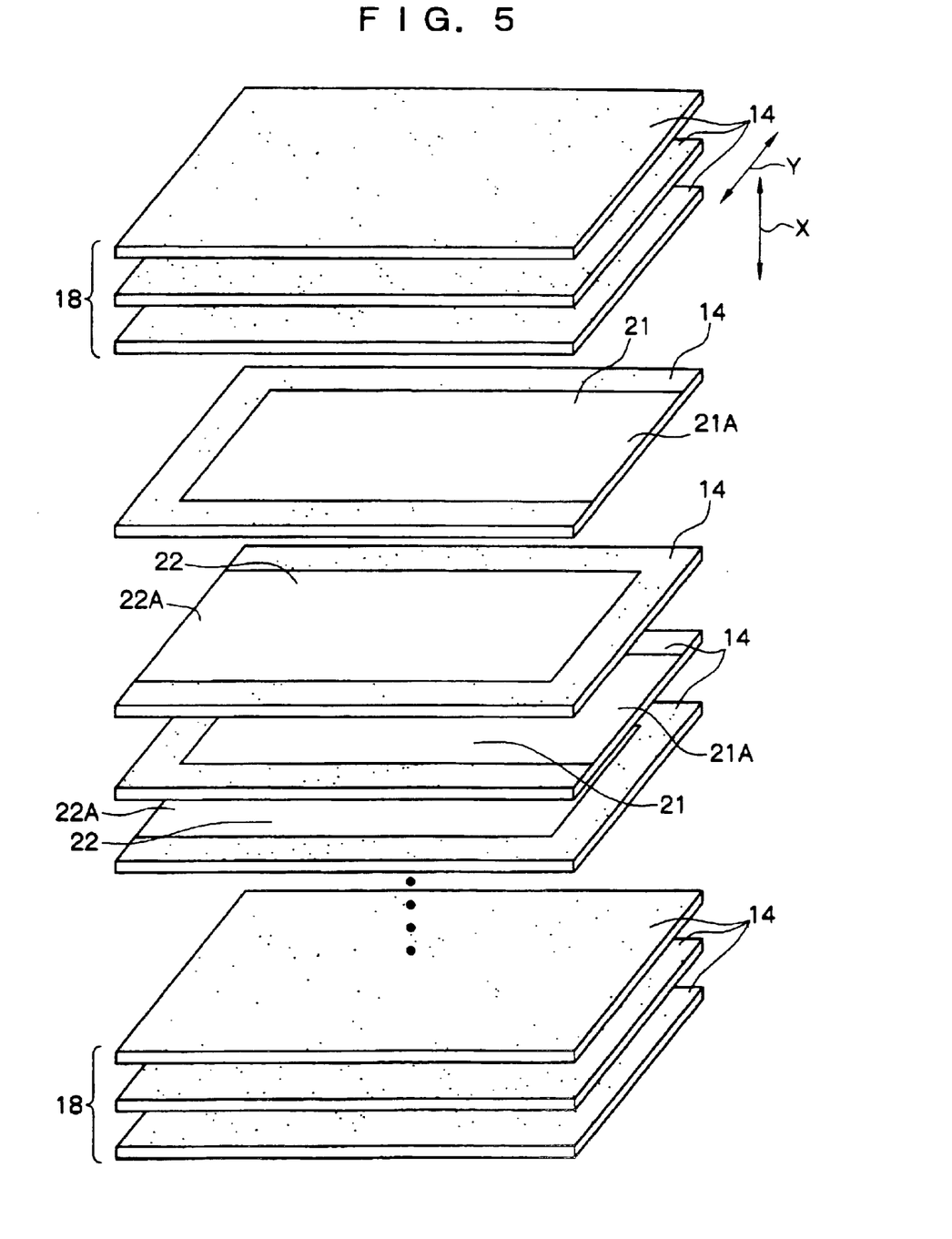
FIG. 5 is an exploded perspective view of the multilayer capacitor according to the embodiment of the present invention.

As shown in FIG. 1, FIG. 2, and FIG. 5, an internal electrode 21 formed in a rectangular shape being a first internal electrode is disposed at a predetermined height position in this dielectric element 12. A leadout portion 21A formed to have the same dimension as the width of the internal electrode 21 is led out from a right end side in FIG. 2 and FIG. 5 of the internal electrode 21.

An internal electrode 22 formed in a rectangular shape being a second internal electrode is further disposed in the dielectric element 12 under the internal electrode 21 across a ceramic layer 14 which is a sintered ceramic green sheet. A leadout portion 22A formed to have the same dimension as the width of the internal electrode 22 is led out from a left end side in FIG. 2 and FIG. 5 of the internal electrode 22.

Further, under this internal electrode 22 across a ceramic layer 14 in the dielectric element 12, an internal electrode 21 having the same shape as that of the aforesaid internal electrode 21 is disposed. Under this internal electrode 21 across a ceramic layer 14 in the dielectric element 12, an internal electrode 22 having the same shape as that of the aforesaid internal electrode 22 is disposed. Hereafter, a large number of the internal electrodes 21 and internal electrodes 22 are stacked in a stack direction (the direction of the arrow X shown in FIG. 1, FIG. 2, and FIG. 5), being alternately arranged in a similar manner. Note that these ceramic layers 14 are also formed in a rectangular shape, and the internal electrodes 21, 22 are positioned substantially in center portions of the respective ceramic layers 14.

As described above, a large number of these internal electrodes 21 and internal electrodes 22 are stacked to face each other, being separated by the ceramic layers 14 which are dielectric layers. Further, an electrode multilayer portion 16 is formed in which each of the stacked ceramic layers 14 is interposed between the plural internal electrodes 21, 22 as shown in FIG. 1 and FIG. 2. A pair of upper and lower margin portions 18 being protective layers in which a plurality of only ceramic layers 14 are stacked are disposed on an upper side and a lower side of this electrode multilayer portion 16 respectively.

These plural ceramic layers 14 including the electrode multilayer portion 16 and the pair of upper and lower margin portions 18 form the dielectric element 12 in a rectangular parallelepiped shape. Note that a material of the upper and lower margin portions 18 is the same as a material of the plural ceramic layers 14 including the electrode multilayer portion 16. Here, a width dimension W of the dielectric element 12 being the multilayer body shown in FIG. 1 is 2 mm or less, for example, 0.8 mm. Further, for example, totally 100 layers or more of the internal electrodes, specifically, 50 sheets or more of the internal electrodes 21 and 50 sheets or more of the internal electrodes 22, are disposed, but a larger number of layers may be disposed. As a material of these internal electrodes, conceivable is, for example, nickel, a nickel alloy, copper, or a copper alloy.

As shown in FIG. 1, end faces 12A positioned in a direction perpendicularly intersecting the stack direction of the dielectric element 12 (the direction of the arrow Y shown in FIG. 1 and FIG. 5) are formed on both end sides of the electrode multilayer portion 16, respectively, in which the plural internal electrodes 21 and the plural internal electrodes 22 exist. Between the end faces 12A and end portions of the internal electrodes 21, 22, a pair of right and left margin portions 20 in which the internal electrodes 21, 22 do not exist and which are formed of a stack of only the ceramic layers 14 being dielectrics are disposed respectively.

Further, the aforesaid pair of upper and lower margin portions 18 in which the internal electrodes 21, 22 do not exist and which is formed of a stack of only the ceramic layers 14 being dielectrics, similarly to the above, are disposed respectively between upper and lower faces 12C and the internal electrodes 21, 22 that are the closest to the upper and lower faces 12C, the upper and lower faces 12C being end faces positioned in the stack direction of the electrode multilayer portion 16 in which the plural internal electrodes 21, 22 exist.

A dimension M1 which is a thickness of each of the pair of upper and lower margin portions 18 in the stack direction and a dimension M2 which is a thickness of each of the pair of right and left margin portions 20 in the direction perpendicularly intersecting the stack direction are both set to dimensions within a range of 50 $\mu$m to 200 $\mu$m. Further, a difference between an average value of the dimensions M1 of the pair of upper and lower margin portions 18 and an average value of the dimensions M2 of the pair of right and left margin portions 20 is within 20% of the average value of the dimensions M1 of the pair of upper and lower margin portions 18. In addition, in this embodiment, a difference between the dimensions M1 of the pair upper and lower margin portions 18 is 20 $\mu$m or less, and a difference between the dimensions M2 of the pair of right and left margin portions 20 is 20 $\mu$m or less.

Figure 3:
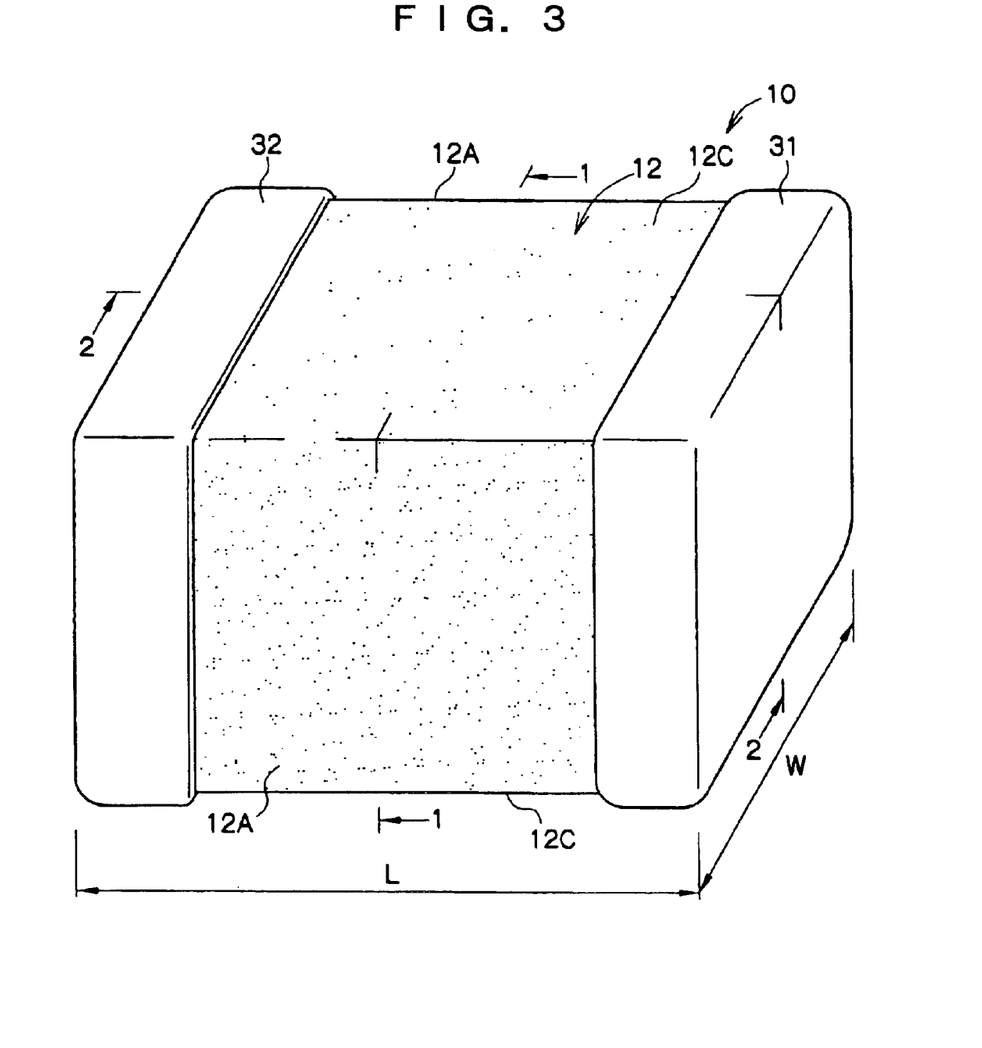
FIG. 3 is a perspective view showing the multilayer capacitor according to the embodiment of the present invention.
Figure 4:
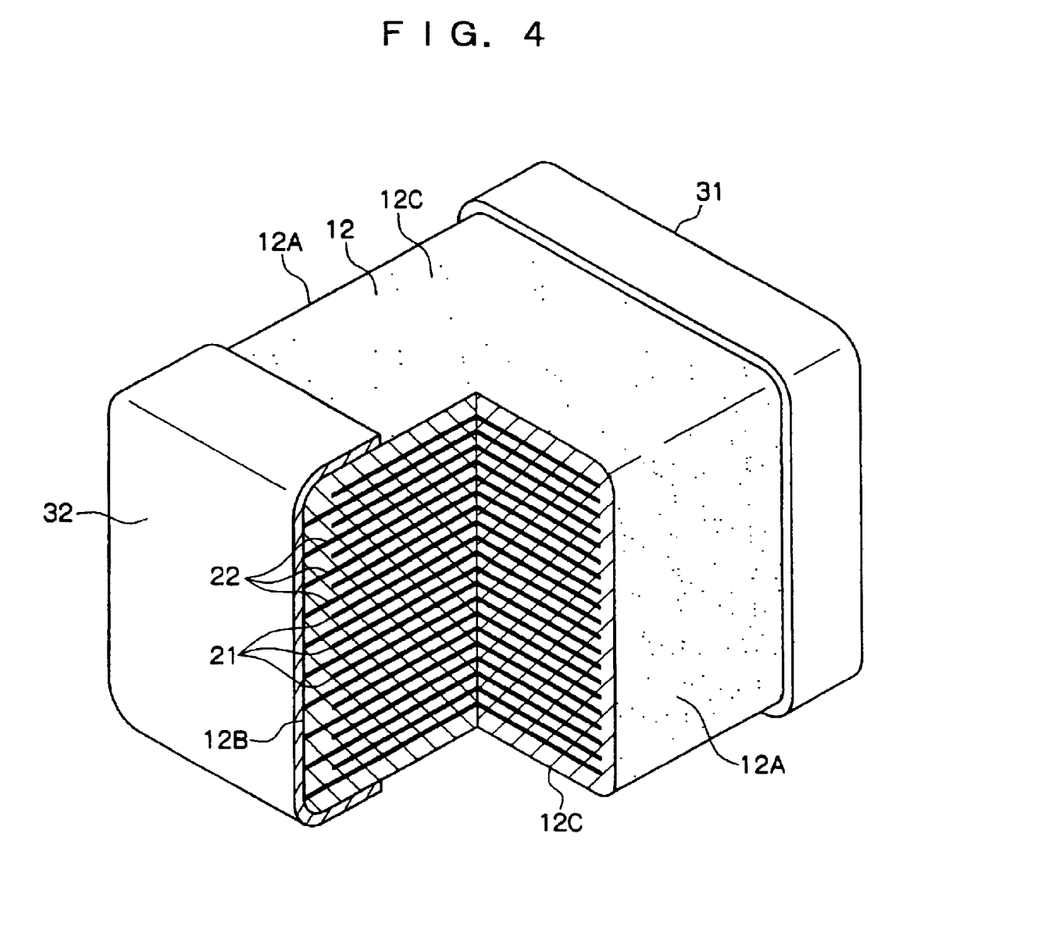
FIG. 4 is a perspective view showing the multilayer capacitor according to the embodiment of the present invention and is a partially cutaway view.

A terminal electrode 31 being a first terminal electrode is disposed on a right side face 12B of the dielectric element 12 as shown in FIG. 2 to FIG. 4 so as to be connected via the leadout portions 21A to the internal electrodes 21 from which the leadout portions 21A are led out to the right end side which is one end side of the dielectric element 12. A terminal electrode 32 being a second terminal electrode is also disposed on a left side face 12B of the dielectric element 12 as shown in FIG. 2 to FIG. 4 so as to be connected via the leadout portions 22A to the internal electrodes 22 from which the leadout portions 22A are led out to the left end side which is the other end side of the dielectric element 12.

As a result of the above, the multilayer capacitor 10 according to this embodiment has a structure such that the terminal electrodes 31, 32 are disposed respectively on the right and left side faces 12B facing each other of the dielectric element 12 in a rectangular parallelepiped shape. Further, the pair of terminal electrodes 31, 32 are connected to a not-shown circuit board via solder or the like, so that the multilayer capacitor 10 is mounted on the circuit board.

Next, the operations of the multilayer capacitor 10 according to this embodiment will be described.

According to the multilayer capacitor 10 of this embodiment, the dielectric element 12 constituting the main body of this multilayer capacitor 10 is formed in a rectangular parallelepiped shape. Further, the plural internal electrodes 21 led out to the side face 12B on the right end side of the dielectric element 12 and the plural internal electrodes 22 led out to the side face 12B on the left end side of the dielectric element 12 are alternately arranged to be stacked in the stack direction (the direction of the arrow X shown in FIG. 1, FIG. 2, and FIG. 5), sandwiching each of the stacked ceramic layers 14 therebetween.

Further, portions formed of the stack of only ceramic layers 14 being dielectrics exist on outer periphery sides of the plural internal electrodes 21, 22 respectively. Accordingly, the pair of upper and lower margin portions 18 in which the internal electrodes 21, 22 do not exist are disposed respectively between the upper and lower faces 12C, which are the end faces positioned in the stack direction of the dielectric element 12, and the internal electrodes 21, 22 that are the closest to the upper and lower faces 12C. The pair of right and left margin portions 20 in which the internal electrodes 21, 22 do not exist are also disposed respectively between the end faces 12A positioned in the direction perpendicularly intersecting the stack direction of the dielectric element 12 (the direction of the arrow Y shown in FIG. 1 and FIG. 5) and the end portions of the internal electrodes 21, 22.

Here, the dimensions M1 of the upper and lower margin portions 18 and the dimensions M2 of the right and left margin portions 20 are all set to dimensions within 50 μm to 200 μm. Moreover, the difference between the average value of the dimensions M1 of the pair of upper and lower margin portions 18 and the average value of the dimensions M2 of the pair of right and left margin portions 20 is within 20% of the average value of the dimensions M1 of the upper and lower margin portions 18. Further, the difference between the dimensions M1 of the pair of upper and lower margin portions 18 and the difference between the dimensions M2 of the pair of right and left margin portions 20 are both 20 μm or less.

In this embodiment, the terminal electrode 31 is disposed on the side face 12B on the right end side of the dielectric element 12 so as to be connected to the plural internal electrodes 21. Further, the terminal electrode 32 is disposed on the side face 12B on the left end side of the dielectric element 12 so as to be connected to the plural internal electrodes 22.

In short, in this embodiment, the dimensions M1, M2 of the upper and lower margin portions 18 and right and left margin portions 20 in which the internal electrodes 21, 22 do not exist but only the dielectrics exist are all set to 50 μm or more. This secures the minimum necessary size for these margin portions, so that the strength of these margin portions against thermal stress can be maintained at a predetermined level or more. In addition, the dimensions M1, M2 of the upper and lower margin portions 18 and right and left margin portions 20 are all 200 μm or less. This stipulates the maximum size of these margin portions, so that it is possible to prevent the dielectric element 12 from becoming larger than necessary.

Meanwhile, the difference between the average value of the dimensions M1 of the pair of upper and lower margin portions 18 and the average value of the dimensions M2 of the pair of right and left margin portions 20 is within 20% of the average value of the dimensions M1 of the pair of upper and lower margin portions 18. This limits the ratio of the dimensions M1 of the upper and lower margin portions 18 and the dimensions M2 of the right and left margin portions 20 so that these dimensions become substantially equal to each other. Consequently, there is no great difference in dimension between the upper and lower margin portions 18 and the left and right margin portions 20.

Accordingly, even when heat is given at the time such as the mounting time on the substrate, the upper and lower margin portions 18 and the right and left margin portions 20 of the dielectric element 12 can have a substantially uniform strength against thermal stress, so that the maximum resistant strength against the deformation caused by this thermal stress is realized with the minimum volume.

With the structure described above, according to this embodiment, the multilayer capacitor 10 that can realize both downsizing and higher capacity is obtained. In addition, even when a large number of the internal electrodes 21, 22 are stacked, each portion of the dielectric element 12 can have a thermal stress resistant strength that is uniform and equal to or higher than a predetermined level to prevent the occurrence of a crack in the dielectric element 12, so that the multilayer capacitor 10 having reliability not lowered with time can be obtained.

In this embodiment, since the difference between the dimensions M1 of the pair of upper and lower margin portions 18 and the difference between the dimensions M2 of the pair of right and left margin portions 20 are both 20 μm or less, the dimension ratio therebetween is limited so that these dimensions become substantially equal to each other. Consequently, these dimensions do not greatly differ from each other. As a result, the four margin portions in the periphery of the dielectric element 12 can have a substantially uniform strength, so that the maximum resistant strength against the deformation caused by thermal stress is more surely realized with the minimum volume.

Moreover, in this embodiment, the material of the ceramic layers 14 forming the upper and lower margin portions 18 is the same as the material of the ceramic layers 14 interposed between the internal electrodes 21, 22. This achieves the operation that the right and left margin portions 20 and the upper and lower margin portions 18 of the dielectric element 12 can have a substantially uniform strength. In addition, the strength of the material itself against thermal stress is also made uniform, so that the maximum resistant strength against thermal stress can be more surely obtained with the minimum volume.

Moreover, in this embodiment, the terminal electrode 31 is disposed on the side face 12B on the right end side of the dielectric element 12 so as to be connected to the plural internal electrodes 21 led out to the right end side of the dielectric element 12. The terminal electrode 32 is also disposed on the side face 12B on the left end side of the dielectric element 12 so as to be connected to the plural internal electrodes 22 led out to the left end side of the dielectric element 12.

Therefore, the terminal electrodes 31, 32 are disposed on both of the side faces 12B of the dielectric element 12 respectively so as to be connected to the plural internal electrodes 21 and the plural internal electrodes 22 respectively. The internal electrodes 21, 22 are connected to the external circuit board via these terminal electrodes 31, 32. Consequently, capacitance: is surely ensured by the ceramic layers 14 interposed between the internal electrodes 21 and the internal electrodes 22.

Next, in order to confirm the effects of the present invention, the evaluation was made on a defective fraction attributed to a crack caused by thermal stress, the result of which will be explained below.

Specifically, 1608 size multilayer capacitors 10, as in this embodiment, with a length dimension L shown in FIG. 3 being 1.6 mm and the width dimension W also shown in FIG. 3 being 0.8 mm, were used as samples, in each of which 100 layers of B characteristic materials were stacked, with the thickness per layer of the ceramic layers 14 being 4 μm.

At this time, the dimension M1 of each of the upper and lower margin portions 18 in which no internal electrode exists was set to 60 μm, and the dimension M2 of each of the right and left margin portions 20 in which similarly no internal electrode exists was set such that a difference ratio thereof to the dimension M1 of each of the upper and lower margin portions 18 becomes −30%, −20%, −10%, 0%, +10%, +20%, and +30% respectively, and a plurality of samples were prepared for each of these 7 types. Besides, a plurality of samples were prepared for each of 7 types in which the dimension M1 of each of the upper and lower margin portions 18 was set to 200 μm, and the dimension M2 of each of the right and left margin portions 20 was similarly set such that a difference ratio thereof to the dimension M1 of each of the upper and lower margin portions 18 becomes −30%, −20%, −10%, 0%, +10%, +20%, and +30% respectively.

Further, the dielectric elements 12 to be the samples of the respective types were subjected to debinding at a temperature of 270° C. in order to remove binders used at the manufacturing time, and thereafter, these dielectric elements 12 were sintered at a temperature of 1250° C. Thereafter, the terminal electrodes 31, 32 were disposed on the side faces 12B of these dielectric elements 12 respectively, so that the multilayer capacitors 10 were completed.

Then, in order to verify the influence of thermal stress, soldering tests to substrates (noted as thermal test in Table 1 and Table 2) were conducted at a temperature of 280° C. on the multilayer capacitors 10 as the respective samples. Specifically, 1000 samples for each type after being mounted on the substrates were visually inspected to find cracks, thereby checking crack resistance. The following Table 1 shows the results on the samples in which the dimension M1 was set to 60 μm, and Table 2 shows the result on the samples in which the dimension M1 was set to 200 μm.

TABLE 1

| evaluation item | −30% | −20% | −10% | 0% | +10% | +20% | +30% |
|---|---|---|---|---|---|---|---|
| thermal test (n = 1000) | 11 | 0 | 0 | 0 | 0 | 0 | 9 |

It has been confirmed from the result in Table 1 that cracks occur both in the "−30%" samples in which the dimension M2 of each of the right and left margin portions 20 is 42 μm and in the "+30%" samples in which the dimension M2 of each of the right and left margin portions 20 is 78 μm. However, in the samples in which the difference ratio of the dimension M2 of each of the right and left margin portions 20 to the dimension M1 of each of the upper and lower margin portions 18 was set within −20% to +20%, no crack occurred, and thus it has been found out that cracks can be prevented in this range.

TABLE 2

| evaluation item | −30% | −20% | −10% | 0% | +10% | +20% | +30% |
|---|---|---|---|---|---|---|---|
| thermal test (n = 1000) | 2 | 0 | 0 | 0 | 0 | 0 | 3 |

It has been confirmed from the result in Table 2 that cracks occur both in the "−30%" samples in which the dimension M2 of each of the right and left margin portions 20 is 140 μm and in the "+30%" samples in which the dimension M2 of each of the right and left margin portions 20 is 260 μm. However, in the sample in which a difference ratio of the dimension M2 of each of the right and left margin portions 20 to the dimension M1 of each of the upper and lower margin portions 18 is within −20% to +20%, no crack occurred as in the aforesaid Table 1, and thus it has been found out as in the aforesaid Table 1 that cracks can be prevented in this range.

In short, these evaluation results verify the effects of the present invention achieved by setting the difference between the dimension M1 of each of the upper and lower margin portions 18 and the dimension M2 of each of the right and left margin portions 20 within 20% of the dimension M1 of each of the upper and lower margin portions 18.

Incidentally, it is conceivable to set a rated voltage of the multilayer capacitor 10 according to the above-described embodiment to 50 V or higher. Further, the multilayer capacitor 10 according to the above-described embodiment has 100 sheets of the internal electrodes 21, 22 and the two terminal electrodes 31, 32. However, the number of layers, the number of the internal electrodes, and the number of the terminal electrodes are not limited to these numbers, but may be larger.

According to the present invention, it is possible to obtain a multilayer capacitor that not only can realize both downsizing and higher capacity, but also has reliability not lowered with time since a crack does not occur in a multilayer body owing to an increased thermal stress resistance even when a large number of layers of internal electrodes are stacked. Further, the present invention is particularly suitable for use as a multilayer ceramic chip capacitor.

What is claimed is:

1. A multilayer capacitor comprising
    a multilayer body as a main body of the multilayer capacitor, in which a plurality of internal electrodes and stacked dielectric layers each interposed between the internal electrodes are disposed, being stacked in a stack direction, and dielectrics are disposed on an outer periphery side of the plural internal electrodes,
    wherein a pair of upper and lower margin portions in which no internal electrode exists are disposed respectively between end faces positioned in the stack direction of the multilayer body and the internal electrodes that are the closest to the end faces positioned in the stack direction,
    wherein a pair of right and left margin portions in which no internal electrode exists are disposed respectively between end faces positioned in a direction intersecting the stack direction of the multilayer body and end portions of the internal electrodes, and
    wherein dimensions of the upper and lower margin portions and dimensions of the right and left margin portions are all 50 µm to 200 µm, and a difference between the dimensions of the upper and lower margin portions and the dimensions of the right and left margin portions is within 20% of the dimensions of the upper and lower margin portions.

2. The multilayer capacitor according to claim 1, wherein the internal electrodes are constituted of a plurality of first internal electrodes led out to one end side of the multilayer body and a plurality of second internal electrodes led out to the other end side of the multilayer body, and the first internal electrodes and the second internal electrodes are stacked, being alternately arranged, and wherein a first terminal electrode is disposed on a side face on the one end side of the multilayer body so as to be connected to the plural first internal electrodes, and a second terminal electrode is disposed on a side face on the other end side of the multilayer body so as to be connected to the plural second internal electrodes.

3. The multilayer capacitor according to claim 1, wherein a difference between an average value of the dimensions of the pair of upper and lower margin portions and an average value of the dimensions of the pair of right and left margin portions is within 20% of the average value of the dimensions of the pair of upper and lower margin portions.

4. The multilayer capacitor according to claim 1, wherein the dielectric layers are ceramic layers formed of sintered ceramic green sheets.

5. The multilayer capacitor according to claim 1, wherein the plural internal electrodes are positioned substantially in center portions of the respective dielectric layers.

6. The multilayer capacitor according to claim 1, wherein each of the plural internal electrodes is made of nickel, a nickel alloy, copper, or a copper alloy.

7. The multilayer capacitor according to claim 1, wherein the number of the internal electrodes is 100 or more.

8. A multilayer capacitor comprising
a multilayer body as a main body of the multilayer capacitor, in which a plurality of internal electrodes and stacked dielectric layers each interposed between the internal electrodes are disposed, being stacked in a stack direction, and dielectrics are disposed on an outer periphery side of the plural internal electrodes, wherein a pair of upper and lower margin portions in which no internal electrode exists are disposed respectively between end faces positioned in the stack direction of the multilayer body and the internal electrodes that are the closest to the end faces positioned in the stack direction, wherein a pair of right and left margin portions in which no internal electrode exists are disposed respectively between end faces positioned in a direction intersecting the stack direction of the multilayer body and end portions of the internal electrodes, and wherein dimensions of the upper and lower margin portions and dimensions of the right and left margin portions are all 50 µm to 200 µm, a difference between the dimensions of the pair of upper and lower margin portions and a difference between the dimensions of the pair of right and left margin portions are both 20 µm or less, and a difference between the dimensions of the upper and lower margin portions and the dimensions of the right and left margin portions is within 20% of the dimensions of the upper and lower margin portions.

9. The multilayer capacitor according to claim 8, wherein the internal electrodes are constituted of a plurality of first internal electrodes led out to one end side of the multilayer body and a plurality of second internal electrodes led out to the other end side of the multilayer body, and the first internal electrodes and the second internal electrodes are stacked, being alternately arranged, and wherein a first terminal electrode is disposed on a side face on the one end side of the multilayer body so as to be connected to the plural first internal electrodes, and a second terminal electrode is disposed on a side face on the other end side of the multilayer body so as to be connected to the plural second internal electrodes.

10. The multilayer capacitor according to claim 8, wherein a difference between an average value of the dimensions of the pair of upper and lower margin portions and an average value of the dimensions of the pair of right and left margin portions is within 20% of the average value of the dimensions of the pair of upper and lower margin portions.

11. The multilayer capacitor according to claim 8, wherein the dielectric layers are ceramic layers formed of sintered ceramic green sheets.

12. The multilayer capacitor according to claim 8, wherein the plural internal electrodes are positioned substantially in center portions of the respective dielectric layers.

13. A multilayer capacitor comprising
a multilayer body as a main body of the multilayer capacitor, in which a plurality of internal electrodes and stacked dielectric layers each interposed between the internal electrodes are disposed, being stacked in a stack direction, and dielectrics are disposed on an outer periphery side of the plural internal electrodes, wherein a pair of upper and lower margin portions in which no internal electrode exists are disposed respectively between end faces positioned in the stack direction of the multilayer body and the internal electrodes that are the closest to the end faces positioned in the stack direction, and a material of dielectric layers forming the pair of upper and lower margin portions is the same as a material of the dielectric layers interposed between the internal electrodes, wherein a pair of right and left margin portions in which no internal electrode exists are disposed respectively between end faces positioned in a direction intersecting the stack direction of the multilayer body and end portions of the internal electrodes, and wherein dimensions of the upper and lower margin portions and dimension of the right and left margin portions are all 50 µm to 200 µm, and a difference between the dimensions of the upper and lower margin portions and the dimensions of the right and left margin portions is within 20% of the dimensions of the upper and lower margin portions.

14. The multilayer capacitor according to claim 13, wherein the internal electrodes are constituted of a plurality of first internal electrodes led out to one end side of the multilayer body and a plurality of second internal electrodes led out to the other end side of the multilayer body, and the first internal electrodes and the second internal electrodes are stacked, being alternately arranged, and wherein a first terminal electrode is disposed on a side face on the one end side of the multilayer body so as to be connected to the plural first internal electrodes, and a second terminal electrode is disposed on a side face on the other end side of the multilayer body so as to be connected to the plural second internal electrodes.

15. The multilayer capacitor according to claim 13, wherein a difference between an average value of the dimensions of the pair of upper and lower margin portions and an average value of the dimensions of the pair of right and left margin portions is within 20% of the average value of the dimensions of the pair of upper and lower margin portions.

16. The multilayer capacitor according to claim 13, wherein the dielectric layers are ceramic layers formed of sintered ceramic green sheets.

17. The multilayer capacitor according to claim 13, wherein the dielectric layers interposed between the internal electrodes and the dielectric layers forming the upper and lower margin portions are both ceramic layers.

18. The multilayer capacitor according to claim 13, wherein the plural internal electrodes are positioned substantially in center portions of the respective dielectric layers.

* * * * *